United States Patent
Yoshioka et al.

(10) Patent No.: US 8,141,445 B2
(45) Date of Patent: Mar. 27, 2012

(54) SUPPORTING STRUCTURE OF BALL SCREW SHAFT

(75) Inventors: Morihisa Yoshioka, Iwata (JP); Keisuke Kazuno, Iwata (JP); Kiyohito Ishikawa, Iwata (JP); Koji Tateishi, Iwata (JP)

(73) Assignee: NTN Corporation (JP)

( * ) Notice: Subject to any disclaimer, the term of this patent is extended or adjusted under 35 U.S.C. 154(b) by 0 days.

(21) Appl. No.: 12/186,683

(22) Filed: Aug. 6, 2008

(65) Prior Publication Data

US 2008/0295625 A1    Dec. 4, 2008

Related U.S. Application Data

(63) Continuation of application No. PCT/JP2007/051136, filed on Jan. 25, 2007.

(30) Foreign Application Priority Data

Feb. 7, 2006    (JP) ................... 2006-029328

(51) Int. Cl.
*F16H 25/20*    (2006.01)
(52) U.S. Cl. ............... 74/89.23; 384/537; 29/898.07; 29/505; 29/509
(58) Field of Classification Search ............ 74/89.23; 29/522.1, 898.061, 898.07, 505, 509; 403/279, 403/283; 384/537, 544, 584
See application file for complete search history.

(56) References Cited

U.S. PATENT DOCUMENTS

| | | | | |
|---|---|---|---|---|
| 2,724,065 A | * | 11/1955 | Saxl | 310/93 |
| 4,574,448 A | * | 3/1986 | Brandenstein et al. | 29/283.5 |
| 6,491,440 B1 | * | 12/2002 | Sahashi et al. | 384/544 |
| 6,935,026 B2 | * | 8/2005 | Frantzen | 29/898.07 |

FOREIGN PATENT DOCUMENTS

| | | |
|---|---|---|
| JP | 60-29925 | 2/1985 |
| JP | 61-29163 | 2/1986 |
| JP | 03-000353 | 1/1991 |
| JP | 09-220904 | * 8/1997 |
| JP | 2005-233358 | 9/2005 |
| JP | 2005-308151 | 11/2005 |
| JP | 2006-52752 | * 2/2006 |
| JP | 2007-182989 | 7/2007 |

* cited by examiner

*Primary Examiner* — William C Joyce
(74) *Attorney, Agent, or Firm* — Harness, Dickey & Pierce, P.L.C.

(57) ABSTRACT

A ball screw shaft supporting structure of a ball screw rotationally supported by a housing via supporting bearings has a screw shaft formed, on its outer circumference, with a fitting portion and a positioning shoulder. An inner ring of the supporting bearing is press fit onto the fitting portion via a predetermined interference. A steel spacer ring is fit onto the fitting portion from the outer side of the supporting bearing with the inner side of the inner ring abutted against the shoulder. A caulking portion is formed on the end of the fitting portion by plastically deforming the end of the fitting portion radially outward. The inner ring is axially immovably secured on the screw shaft by the caulking portion via, the spacer ring.

4 Claims, 4 Drawing Sheets

(a)

(b)

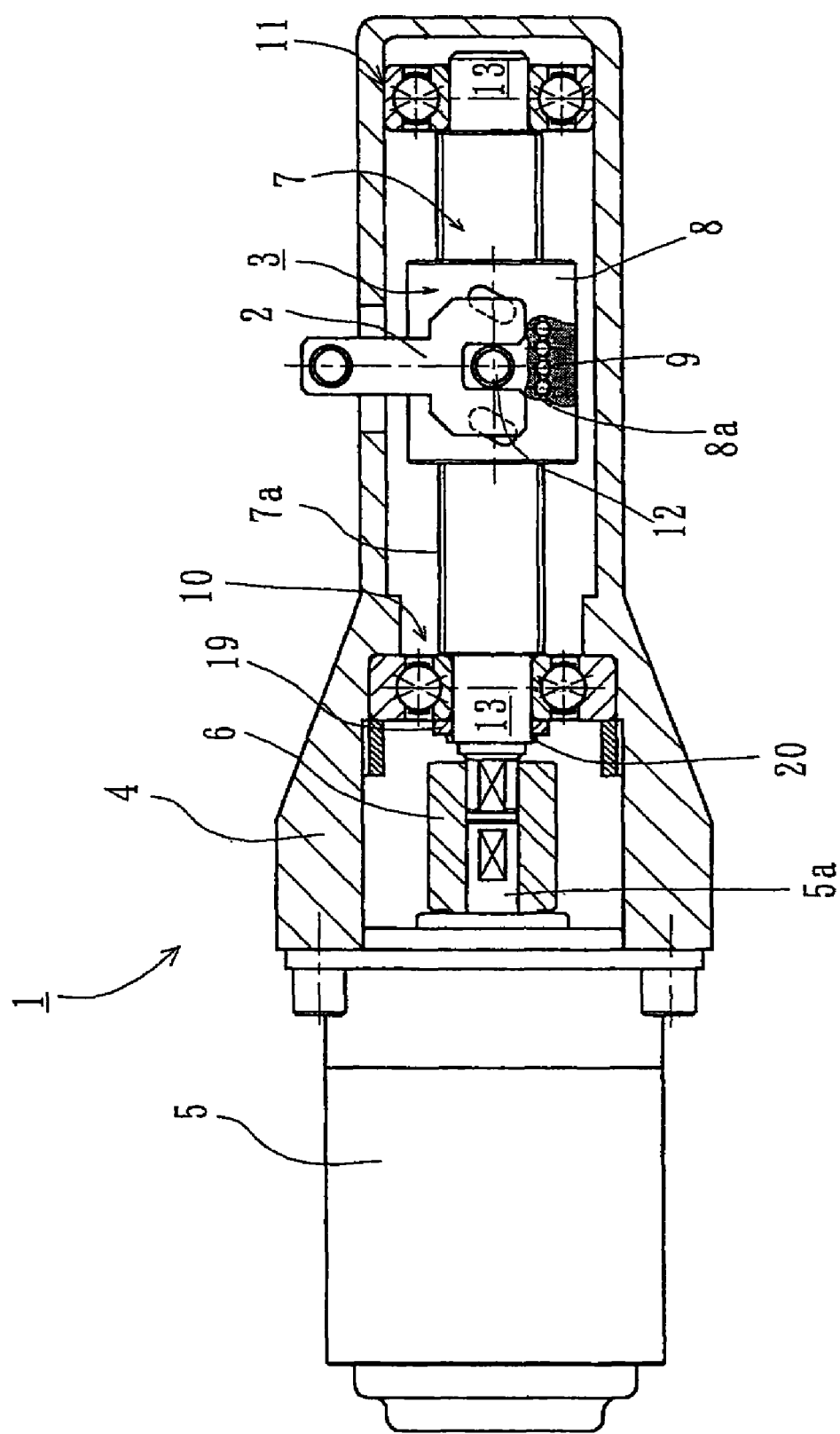
[Fig 1]

[Fig 2]
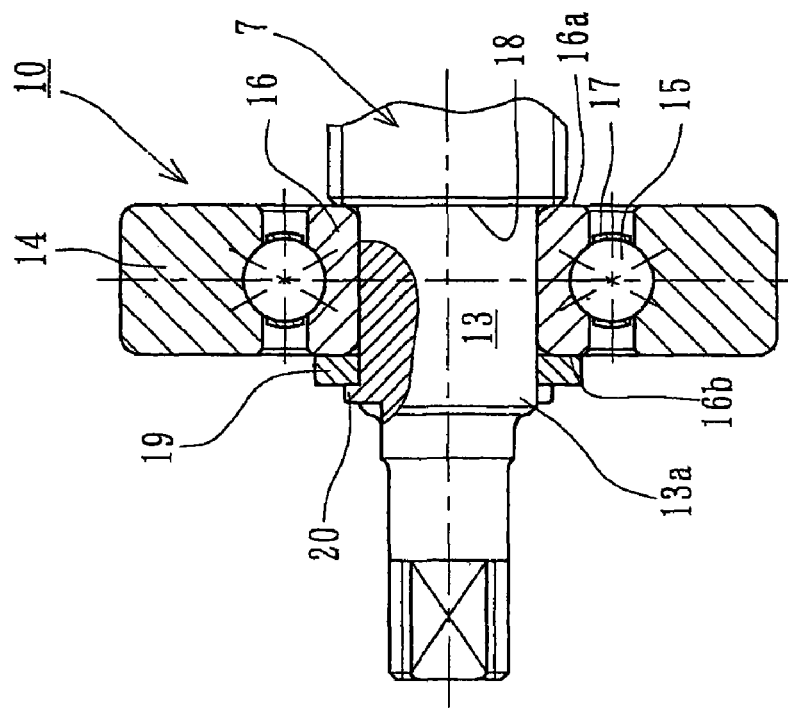
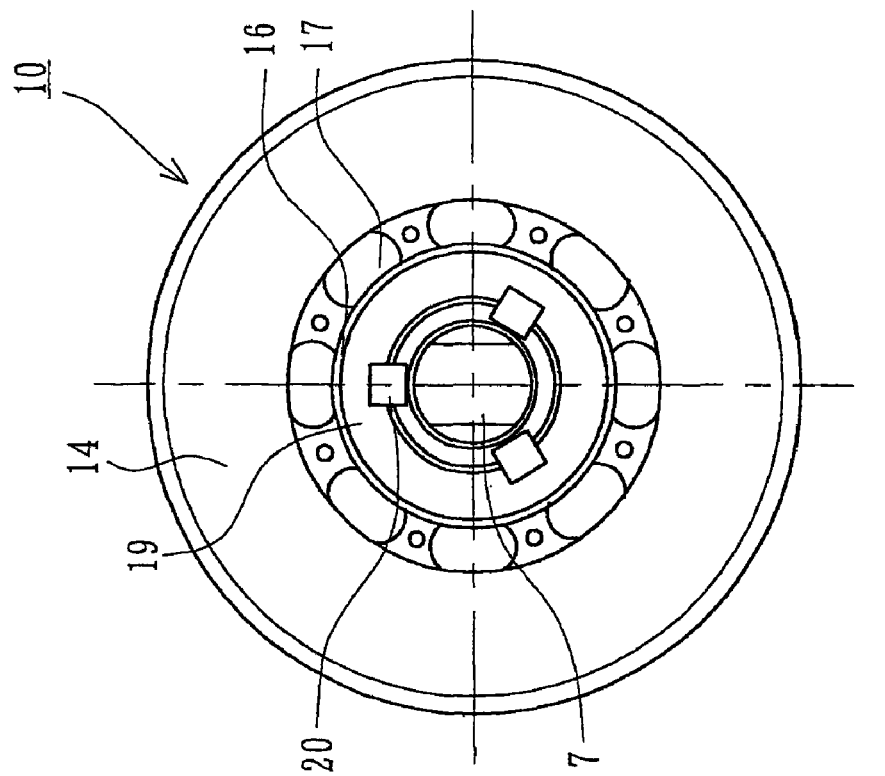

[Fig 3]
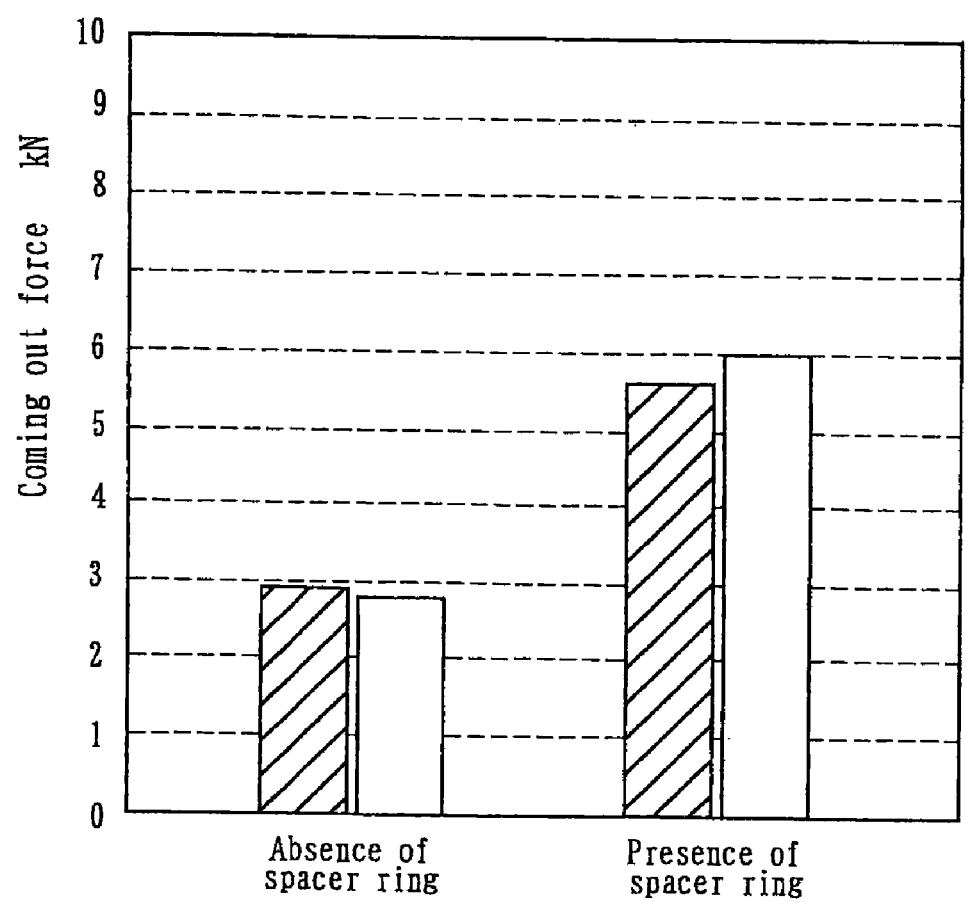

[Fig 4]
PRIOR ART
(a)
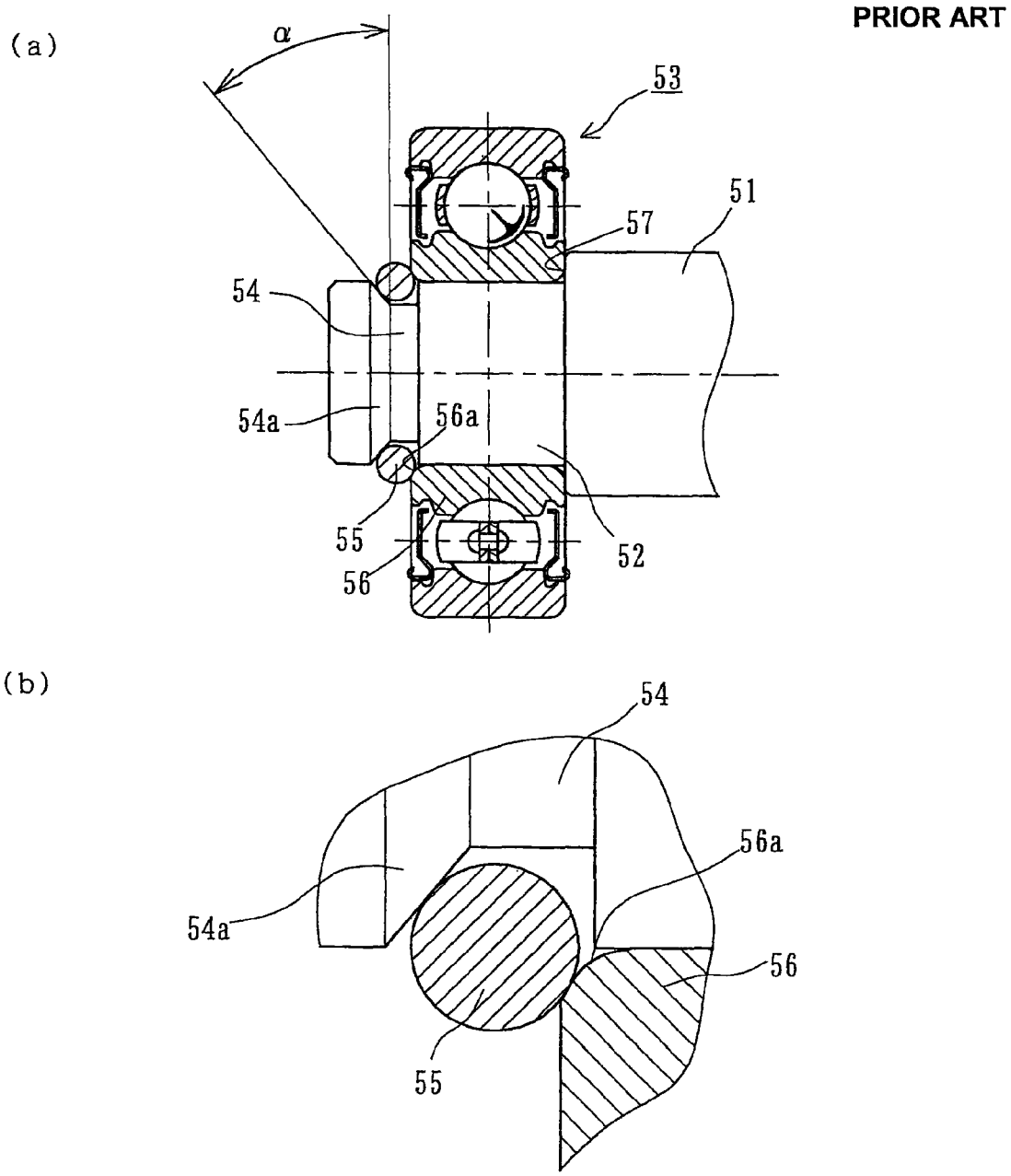
(b)

SUPPORTING STRUCTURE OF BALL SCREW SHAFT

CROSS-REFERENCE TO RELATED APPLICATIONS

This application is a continuation of International Application No. PCT/JP2007/051136, filed Jan. 25, 2007, which claims priority to Japanese Application No. 2006-029328, filed Feb. 7, 2006. The disclosures of the above applications are incorporated herein by reference.

FIELD

The present disclosure relates to a supporting structure of a ball screw shaft in a ball screw used for various kinds of machine tools such as an electric discharge machine and a tapping center etc. or actuators in automobiles.

BACKGROUND

Ball screws used in machine tools or automobiles actuators, are rotationally supported by rolling bearings, such as deep groove ball bearings, at both ends of the screw shaft. In general, an inner ring of the rolling bearing, to which an axial load of the screw shaft is applied, is immovably axially secured by a snap ring. This provides inexpensive and easy assembly.

However, it is inevitable when using a snap ring that an axial looseness caused by dimensional errors between the ring groove and the inner ring of the bearing will occur. Thus, this often causes problems in reliability and durability of the ball screw due to slipping off or damage of the snap ring and ultimately the inner ring coming out of the bearing.

To solve such a problem, a supporting structure for a ball screw shaft is known and shown in FIG. 4. The end of the ball screw shaft 51 is formed with a fitting portion 52 and a shoulder 57. An end face of an inner ring 56 of a rolling bearing 53 abuts the shoulder 57. The end face of the shoulder 57 of the ball screw shaft 51 is formed by tops and bottoms of the screws and threads and thus the end face of the shoulder 57 is not formed by a perfect flat annular surface. Accordingly, the outer diameter of the fitting portion 52 is formed smaller than the bottom diameter of the screw grooves (not shown). The end of the ball screw shaft 51 is formed with an annular groove 54 having a side wall 54a inclined at a predetermined angle α. A securing ring 55 is snapped into the annular groove 54 between the side wall 54a and a chamfered surface 56a of the inner ring 56 of the rolling bearing 53.

The securing ring 55 is formed by a wire having a circular cross section. Its inner diameter is somewhat smaller than the outer diameter of the fitting portion 52 of the screw shaft 51. The diameter of the wire itself is somewhat larger than an annular gap formed between the chamfered surface 56a and the side wall 54a of the annular groove 54. The securing ring 55 is resiliently snapped in the annular groove 54 between the chamfered surface 56a and the annular groove 54. Thus, the inner ring 56 is urged forward to the end face of the shoulder 57 of the ball screw shaft 51 by an axial force as a component force by the action of the inclination angle α of the side wall 54a. Thus, the inner ring 56 is secured on the fitting portion 52 of the ball screw shaft 51 without any axial looseness. Accordingly, it is possible to reduce assembly steps, the number of parts and thus the manufacturing cost. This produces a realized reduction of size of the supporting portion as well as improves the reliability and durability of the ball screw (see Japanese Laid-open Patent Publication No. 233358/2005).

SUMMARY

In the supporting structure of the ball screw shaft of the prior art, it is believed that the inner ring 56 will come out of the fitting portion due to vibration and shock loads when the ball screw is used in engine controlling instruments of an automobile since the inner ring 56 is secured only by an elastic force of the securing ring 55.

It is, therefore, an object of the present disclosure to provide a supporting structure of a ball screw shaft that improves in the durability, reliability and size and is manufactured at a low cost.

To achieve the object, a supporting structure of a ball screw shaft for a ball screw rotationally supported by a housing via supporting bearings is provided. The screw shaft is formed, on its outer circumference, with a fitting portion and a positioning shoulder. An inner ring, of the supporting bearing, is press fit onto the fitting portion via a predetermined interference. A steel spacer ring is fit onto the fitting portion from the outer side of the supporting bearing with the inner side of the inner ring abutted against the shoulder. A caulking portion is formed on the end of the fitting portion by plastically deforming the end of the fitting portion radially outward. The inner ring is axially immovably secured on the screw shaft by the caulking portion via the spacer ring.

Since the screw shaft is formed, on its outer circumference, with a fitting portion and a positioning shoulder, an inner ring of the supporting bearing is press fit onto the fitting portion, via a predetermined interference. A steel spacer ring is fit onto the fitting portion from the outer side of the supporting bearing with the inner side of the inner ring abutted against the shoulder. A caulking portion is formed on the end of the fitting portion by plastically deforming the end of the fitting portion radially outward. The inner ring is axially immovably secured onto the screw shaft by the caulking portion, via the spacer ring. Thus, it is possible to provide a ball screw shaft supporting structure that improves durability and reliability and is made in a compact size at a low cost.

The shoulder and the fitting portion of the screw shaft are hardened by induction hardening to have a predetermined surface hardness. On the contrary, the caulking portion is not hardened and remains with the hardness of its original material. This makes it possible to prevent fretting wear in the fitting portion and the shoulder and the generation of micro cracks in the caulking portion during the caulking process. Thus, this improves the reliability and durability of the ball screw.

A plurality of caulking portions are equidistantly arranged along the circumference of the end of the fitting portion. Alternatively, a continuous caulking portion is arranged along the whole circumference of the end of the fitting portion.

The spacer ring is formed by press machining of a steel sheet of low carbon steel to have a substantially rectangular cross section. This enables manufacturing of the ball screw at a low cost while reducing material costs and machining.

According to the ball screw shaft supporting structure, the screw shaft is formed, on its outer circumference, with a fitting portion and a positioning shoulder. An inner ring of the supporting bearing is press fit onto the fitting portion, via a predetermined interference. A steel spacer ring is fit onto the fitting portion from the outer side of the supporting bearing with the inner side of the inner ring abutted against the shoulder. A caulking portion is formed on the end of the fitting portion by plastically deforming the end of the fitting portion radially outward. The inner ring is axially immovably secured on the screw shaft by the caulking portion, via the spacer ring. Thus, it is possible to provide a supporting structure of a ball screw shaft that improves durability and reliability and is made in a compact size at a low cost.

A ball screw shaft supporting structure for a ball screw is rotationally supported by a housing via supporting bearings. The screw shaft is formed, on its outer circumference, with a fitting portion and a positioning shoulder. An inner ring of the supporting bearing is press fit onto the fitting portion via a predetermined interference. A spacer ring is formed by press machining of a steel sheet of low carbon steel to have a substantially rectangular cross section to be fit onto the fitting portion from the outer side of the supporting bearing. The inner side of the inner ring is abutted against the shoulder. A caulking portion is formed on the end of the fitting portion by plastically deforming the end of the fitting portion radially outward. The inner ring is axially immovably secured on the screw shaft by the caulking portion, via the spacer ring.

DRAWINGS

Additional advantages and features of the present disclosure will become apparent from the subsequent description and the appended claims, taken in conjunction with the accompanying drawings, wherein:

FIG. 1 is a longitudinal section view of an electric linear actuator with a supporting structure of a ball screw shaft.

FIG. 2a is an enlarged front elevation view of the supporting structure of the ball screw shaft.

FIG. 2b is an enlarged longitudinal section view of the supporting structure of the ball screw shaft.

FIG. 3 is a graph showing results of a comparing experiment of the coming out force of an inner ring of a supporting bearing in cases of presence and absence of the spacer ring.

FIG. 4a is a longitudinal section view of the supporting structure of a ball screw shaft of the prior art.

FIG. 4b is an enlarged view of the supporting structure of a ball screw shaft of the prior art.

DETAILED DESCRIPTION

Preferred embodiments of the present disclosure will be described with reference to the accompanying drawings.

FIG. 1 is a longitudinal section view of an electric linear actuator with a ball screw shaft supporting structure of the present disclosure. FIGS. 2a and 2b are an enlarged front elevation view and an enlarged longitudinal section view, respectively, of the ball screw shaft supporting structure. In the description, the motor side of the ball screw is referred to as an outer side (a left side in drawings) and the opposite side is referred to as an inner side (a right side in drawings).

The electric linear actuator 1 comprises a link 2, a ball screw 3, housing 4 and an electric motor 5 drives a driven member (not shown) via the link 2. The electric motor 5 is mounted on the housing 4 to drive the ball screw 3.

The ball screw 3 has a screw shaft 7 connected to a motor shaft 5a of the electric motor 5, via a coupling 6. The screw shaft 7 is rotationally driven by the electric motor 5. A nut 8 is formed, on its inner circumferential surface, with helical screw grooves 8a arranged opposite to helical screw grooves 7a. The helical screw grooves 7a are formed on the outer circumferential surface of the screw shaft 7. A plurality of balls 9 is contained between the screw grooves 7a, 8a. The cross sectional configuration of each screw groove 7a, 8a may be a circular arc configuration or a Gothic arc configuration.

The illustrated embodiment adopts the Gothic arc configuration because it can set a large contacting angle against the balls 9 as well as a small axial gap. This increases the rigidity against the axial load and suppresses the generation of vibration.

The screw shaft 7 is supported on the housing 4 via supporting bearings 10, 11. The supporting bearings 10, 11 are a pair of rolling bearings rotationally but axially immovably relative to the housing 4. The nut 8 has on its outer circumferential surface a pair of projecting supporting shafts 12. The shafts 12 are perpendicular to the axis of the screw shaft 7. The shafts 12 pivotally support one end of the link 2. Accordingly, the nut 8 is axially movably supported on the screw shaft 7 but not-rotationally.

As is well known in the art, when the screw shaft 7 is rotated by the electric motor 5, the nut 8 is driven by the screw shaft 7 along its axis (left and right directions in FIG. 1). The rotational motion of the motor shaft 5a is converted into axial motion of the nut 8 via the ball screw 3. The link 2, connected to the nut 8 via the supporting shafts 12, is swingably moved by the nuts axial movement.

At least one of the supporting bearings 10, 11 comprises a four-point contact ball bearing and press fitted on a fitting portion 13 formed on the end of the screw shaft 7. Although these supporting bearings 10, 11 are single row rolling bearing they can bear both the axial load and the moment load applied to the screw shaft 7 and accordingly it is possible to reduce the weight and size of the ball screw 3.

As shown in an enlarged view of FIG. 2, the supporting bearing 10 at the motor side comprises an outer ring 14 fit into the housing 4 (FIG. 1). An inner ring 16 is arranged within the outer ring 14, via a plurality of rolling elements (balls) 15. Cages 17 rollably hold the balls 15. It will be appreciated that the supporting bearings 10, 11 are not limited to the four-point contact ball bearings and that other types of bearings, such as deep groove ball bearings, angular-contact ball bearings, double row combination of the angular-contact ball bearings or double row angular-contact ball bearings may be used.

The fitting portion 13 formed on the end of the screw shaft 7 includes a shoulder 18 against which the end face of the inner ring 16 abuts. Since the circumference of the end face of the shoulder 18 of the ball screw shaft 7 includes tops and bottoms of the screw grooves, the end face of the shoulder 18 is not formed by a perfect annular flat surface. Thus, it is possible that the supporting bearing 10 would be secured at an inclined condition. According to the present disclosure, the outer diameter of the fitting portion 13 is formed smaller than the bottom diameter of the screw grooves (not shown).

The screw shaft 7 is formed of medium carbon steel including carbon of 0.40~0.80% by weight such as S53C. It is hardened by induction hardening so that a region including the screw grooves 7a, the shoulder 18 and the fitting portion 13 have a hardened layer having a hardness of 54~64 HRC. Accordingly, the fretting abrasion of the fitting portion 13 and the shoulder 18 can be prevented. The end 13a of the fitting portion 13 is not hardened and remained as its original material. The inner ring 16 of the supporting bearing 10 is press fit onto the fitting portion 13, via a predetermined interference. A steel spacer ring 19, with a substantially rectangular cross section, is fit onto the fitting portion 13 from the outer side of the supporting bearing 10. The inner side end face 16a of the inner ring 16 abuts against the shoulder 18.

A caulking portion 20 is formed on the end 13a of the fitting portion 13 by plastically deforming the end 13a radially outward. This urges the end 13a against the spacer ring 19. The caulking portion 20 secures the supporting bearing 10 against the screw shaft 7 without any axial looseness. Since the end 13a of the fitting portion 13 is not hardened, having the hardness of its original material, it is possible to prevent the generation of micro cracks etc. in the caulking portion 20 that would give influence to the durability of the ball screw 3 during the caulking process. Thus, this improves the reliability and durability of the ball screw. In the illustrated embodiment, although it is shown that three caulked portions 20 are equidistantly formed along the circumference of the end 13a of the fitting portion 13 (see FIG. 2 (a)), it is possible to form more than 3 caulking portions or a continuous caulking portion 20 along the entire circumference of the end 13a of the fitting portion 13.

The spacer ring 19 is formed of cold rolled steel sheet (JIS SPCC family etc.) or low carbon steel (JIS SC family etc.) by a pressing process and not hardened by heat treatment etc. This suppresses the costs of material and machining and thus realizes a manufacturing cost reduction. Arrangement of the spacer ring 19 between the inner ring 16 of the bearing 10 and the caulking portion 20 prevents elastic deformation of the inner ring 16 towards a radially outward direction even if the caulking strength is sufficiently increased. Usually, a radially outward force is applied on the inner circumferential surface of the inner ring 15 adjacent to the caulking portion 20. However, the radially outward force can be relieved by the spacer ring 19. Accordingly, it is possible to suppress the deformation of the inner diameter of the inner ring 16, which would be caused during formation of the caulking portion 20, and thus to prevent the generation of damage in the inner ring 16. Accordingly, it is possible to provide a ball screw shaft supporting structure that can be manufactured at a low cost and has excellent durability and reliability.

FIG. 3 is a graph showing results of a comparing experiment of the coming out force (caulking force) of the inner ring 16 of the supporting bearing 10 in the presence and absence of the spacer ring 19. In this experiment, a deep groove ball bearing (JIS#6201) is substituted for the supporting bearing 10 and a ring member of S25C, having an inner diameter of 12.08 mm, an outer diameter of 22 mm and a width of 2 mm formed by cutting, is used as the spacer ring 19. Caulking was performed at a maximum load wherein the variation of a radial gap of the supporting bearing 10 is zero (0). The coming out force is defined as a load by which the inner ring 16 is pulled out from the fitting portion 13 and is measured by using the Amsler type testing machine. As can be clearly appreciated, the coming out force when the spacer ring 19 is arranged between the caulking portion 20 and the inner ring 16 increases to substantially twice the coming out force when the spacer ring 16 is not arranged therebetween.

The ball screw shaft supporting structure of the present disclosure can be applied to any type of supporting structure that rotationally supports the ball screw shaft via rolling bearings without being restricted by types or structures of the bearings.

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A ball screw shaft supporting structure of a ball screw rotationally supported by a housing via supporting bearings comprising:
   a rotating screw shaft formed, on its outer circumference, with a fitting portion and a positioning shoulder;
   an inner ring of the supporting bearing being press fit onto the fitting portion via a predetermined interference;
   a steel-spacer-ring-is fit onto the fitting portion from outer side of the supporting bearing with the inner side of the inner ring abutted against the shoulder, the spacer ring abutting against approximately an entire surface of the outer side end face of the inner ring; and
   a plurality of independent and discrete caulking portions that are equidistantly formed and spaced along a circumference of the end of the fitting portion by plastically deforming the end of the fitting portion at the plurality of portions radially outward, the inner ring being axially immovably secured on the rotating screw shaft by the plurality of caulking portions via the spacer ring abutting the inner ring such that deformation of the inner ring is suppressed by the spacer ring relieving the radially outward force of the caulking.

2. The ball screw shaft supporting structure of claim 1 wherein the shoulder and the fitting portion of the screw shaft are hardened by induction hardening to have a predetermined surface hardness, and the caulking portion is not hardened and has a hardness of its original material.

3. The ball screw shaft supporting structure of claim 1 wherein the spacer ring is formed by press machining of a steel sheet of low carbon steel to have a substantially rectangular cross section.

4. A ball screw shaft supporting structure of a ball screw rotationally supported by a housing via supporting bearings comprising:
   a rotating screw shaft formed, on its outer circumference, with a fitting portion and a positioning shoulder;
   an inner ring of the supporting bearing being press fit onto the fitting portion via a predetermined interference;
   a steel spacer ring is fit onto the fitting portion from outer side of the supporting bearing with the inner side of the inner ring abutted against the shoulder, and the spacer ring abuts against approximately an entire surface of the outer side end face of the inner ring; and
   at least three independent and discrete caulking portions formed and spaced from one another on the end of the fitting portion by plastically deforming the end of the fitting portion at the at least three independent and discrete caulking portions radially outward, the inner ring being axially immovably secured on the rotating screw shaft by the at least three independent and discrete caulking portions via the spacer ring such that deformation of the inner ring is suppressed by the spacer ring relieving the radially outward force of the caulking which relieves the radially outward force and suppresses the deformation of the inner ring caused by the deformation of the at least three independent and discrete caulking portions.

* * * * *

UNITED STATES PATENT AND TRADEMARK OFFICE
CERTIFICATE OF CORRECTION

| | | |
|---|---|---|
| PATENT NO. | : 8,141,445 B2 | Page 1 of 1 |
| APPLICATION NO. | : 12/186683 | |
| DATED | : March 27, 2012 | |
| INVENTOR(S) | : Morihisa Yoshioka et al. | |

It is certified that error appears in the above-identified patent and that said Letters Patent is hereby corrected as shown below:

Column 6
Line 9, claim 1 "steel-spacer-ring-is" should be --steel spacer ring is--

Signed and Sealed this
Tenth Day of July, 2012

David J. Kappos
*Director of the United States Patent and Trademark Office*